United States Patent
Freitas et al.

(10) Patent No.: US 9,293,948 B2
(45) Date of Patent: Mar. 22, 2016

(54) RENEWABLE UNINTERRUPTED POWER SUPPLY FOR CRITICAL NODE INFRASTRUCTURE SUPPORT

(71) Applicant: Sundial Energy, Inc., Tucson, AZ (US)

(72) Inventors: Robert J. Freitas, Tucson, AZ (US); Michael D. Freitas, Tucson, AZ (US); Michael Pena, Tucson, AZ (US); Clayton Esterson, Tucson, AZ (US); Joel Pearson, Tucson, AZ (US)

( * ) Notice: Subject to any disclaimer, the term of this patent is extended or adjusted under 35 U.S.C. 154(b) by 251 days.

(21) Appl. No.: 14/031,770

(22) Filed: Sep. 19, 2013

(65) Prior Publication Data

US 2014/0080406 A1    Mar. 20, 2014

Related U.S. Application Data

(60) Provisional application No. 61/703,076, filed on Sep. 19, 2012.

(51) Int. Cl.
*H04B 1/16* (2006.01)
*H02J 7/00* (2006.01)
*H02J 9/06* (2006.01)
*H02J 7/35* (2006.01)

(52) U.S. Cl.
CPC .......... *H02J 9/061* (2013.01); *H02J 7/355* (2013.01); *H02J 9/062* (2013.01); *Y02B 10/72* (2013.01); *Y02E 10/566* (2013.01); *Y10T 307/625* (2015.04)

(58) Field of Classification Search
None
See application file for complete search history.

(56) References Cited

U.S. PATENT DOCUMENTS

| | | | |
|---|---|---|---|
| 5,107,637 A * | 4/1992 | Robbins | 52/28 |
| 6,693,556 B1 * | 2/2004 | Jones et al. | 340/907 |
| 7,040,773 B1 * | 5/2006 | Zincone et al. | 362/20 |
| 7,969,757 B2 * | 6/2011 | Kernahan | 363/98 |
| 8,053,929 B2 * | 11/2011 | Williams et al. | 307/82 |
| 2006/0085167 A1 * | 4/2006 | Warfield et al. | 702/188 |
| 2007/0126599 A1 * | 6/2007 | Gembala et al. | 340/908 |
| 2009/0000221 A1 * | 1/2009 | Jacobs et al. | 52/173.3 |
| 2009/0038673 A1 * | 2/2009 | Ware | 136/246 |
| 2009/0323311 A1 * | 12/2009 | Mezouari | 362/97.1 |
| 2010/0180523 A1 * | 7/2010 | Lena et al. | 52/173.3 |
| 2011/0175662 A1 * | 7/2011 | Said El-Barbari et al. | 327/319 |
| 2011/0194270 A1 * | 8/2011 | Di Trapani et al. | 362/2 |
| 2011/0209849 A1 * | 9/2011 | Reichert et al. | 165/47 |
| 2011/0305114 A1 * | 12/2011 | Golparian et al. | 367/77 |
| 2012/0176079 A1 * | 7/2012 | Nakashima et al. | 320/101 |
| 2012/0191263 A1 * | 7/2012 | Kuniyosi | 700/286 |
| 2012/0211004 A1 * | 8/2012 | Goldman et al. | 126/704 |
| 2012/0281444 A1 * | 11/2012 | Dent | 363/56.01 |
| 2012/0300440 A1 * | 11/2012 | Miyamae et al. | 362/183 |
| 2013/0100286 A1 * | 4/2013 | Lao | 348/148 |
| 2013/0141902 A1 * | 6/2013 | Akdag | 362/191 |

* cited by examiner

*Primary Examiner* — Dominic E Rego

(57) ABSTRACT

A platform to supply renewable backup power to critical node infrastructure is disclosed. The platform conceals solar photovoltaic modules and storage batteries in plain sight by hiding such components in commonly encountered urban furniture, such as bus shelters. In particular, a bus shelter ad box is used to conceal or cloak certain components of the system.

13 Claims, 12 Drawing Sheets

O RED – OUTAGE
△ AMBER – OUT OF RANGE
◇ GREEN – NORMAL

RENEWABLE UNINTERRUPTED POWER SUPPLY FOR CRITICAL NODE INFRASTRUCTURE SUPPORT

CROSS-REFERENCE TO RELATED APPLICATIONS

The present application claims benefit of and priority from the U.S. Provisional Application No. 61/703,076 filed on Sep. 19, 2012 and titled "Critical Node Infrastructure Support (CNIS) Platform Employing Renewable Energy for True UPS". The disclosure of the above-mentioned patent application is incorporated herein by reference in its entirety.

FIELD OF THE INVENTION

The invention relates generally to a solar energy renewable power supplies with energy storage and intelligent controls for powering elements of critical infrastructure during a loss of grid power.

BACKGROUND OF THE INVENTION

Critical elements of public infrastructure remain vulnerable to disasters, natural or man made. In particular, because of the ad hoc nature of the development of the U.S. power grid, critical elements of power infrastructure, from generation sources, to large step-up and step-down transformers, to smaller, local transformers, remain vulnerable to natural calamity or intentional sabotage. A power-down condition at any of these critical nodes in the grid can result in widespread, persistent power outages. By way of example, in September of 2011, human error by a single electrical linesman working in western Arizona knocked out power to the greater San Diego area, parts of northern Mexico, and parts of southwestern Arizona, leaving more than 3 million people without power. This error was unintentional, and at a point source, but caused an area wide disruption. Traffic snarled and surface transportation grid-lock resulted.

A more important concern is what happens when an area wide disruption, natural or man-made, shuts down the electrical grid on an even wider basis. Because of the interconnected nature of the U.S. power grid, and the long distances involved between generation points and highly-populated areas of use, the U.S. power grid is uniquely vulnerable to outages. The chaos caused by widespread and persistent power outages due to weather events, such as Katrina and Sandy is well documented. However, other risks to the grid exist. For example, astronomical events astronomical events, such as the March 1989 solar storm over Quebec, and other natural disasters, such as large western wild lands fires, have all played a roll in widespread blackouts. As global climate change adds energy to the weather system, extreme weather events are expected to pose an increasing challenge to the resiliency of the U.S. power grid. The power grid is also, unfortunately, susceptible to human sabotage. Both cyber attacks, and physical attacks at key elements of grid infrastructure, could affect millions of power users.

It is difficult to overstate the importance of a resilient power grid to well-ordered, modern life. Modern transportation systems are entirely dependent on reliable power delivery. If traffic signals are lost due to an electricity outage, traffic grid-lock ensues, and as a result, first responders cannot move effectively to provide needed assistance, people cannot move to safer areas nor, if necessary, evacuate in a timely manner. Similar vulnerabilities exist with regard to the modern cellular communications network. Like traffic signals, cellular transmit/receive towers and relay stations also are dependent upon a constant source of electricity, without which, the communication system rapidly degrades. During any widespread natural or human cause disaster, use of cellular communications infrastructure spikes, which increases the need for a reliable cellular network in times of disaster.

Currently, most surface transportation signals lack back-up power systems. Certain conventional infrastructure (e.g., traffic signals, larger cellular transmit/receive towers, and smaller cellular relays) is protected by so-called uninterruptable power systems or "UPS", which are either battery-based or include generators that come on-line automatically when a loss of grid power is sensed. However, UPS, as currently implemented, is actually time-limited power and is not truly uninterruptible. The reality is that most UPS systems have a very limited time within they will provide power with which a system can continue to function. Once the stored energy of the battery is exhausted or the fuel tank of the generator is empty, the backup power shuts off and so does the device that the UPS is supporting. A more accurate description of these systems is that of a "time-limited" backup power supply.

Moreover, conventional infrastructure power backup systems make attractive targets for thievery and sabotage. Gasoline or diesel generators, which are often used to supply backup power to critical traffic signals, are routinely stolen during natural disasters. For example, during the eastern storm in the U.S. known as "Derecho" occurring on Jun. 29, 2012, which had effects lasting through July $6^{th}$, generators installed specifically to power intersection signal lights were reported to have been stolen from a number of locations. This behavior is not limited to the U.S. In Brazil, theft of solar panels is common, and a director of British Telecom noted that plans to provide cell relay stations in the UK with battery backup systems (BBS) would likely suffer from battery thefts. Thus, simply mounting photovoltaic (PV) panels or installing generators at intersections or along rights-of-way does not provide an adequate solution. Visible solar panels or generators are targets for theft, especially during periods of prolonged electrical outages, when such equipment is particular valuable to individuals.

SUMMARY OF THE INVENTION

The invention is directed to providing solar powered battery backup power to nodes of critical infrastructure ("CNIS"), such as cellular towers, relays and traffic signals. In certain embodiments of the invention, backup power sources are provided that include a battery bank charged by a photovoltaic solar cell array. The backup sources are connected to the power grid, and to the node of critical infrastructure, such that they can automatically detect a loss of power at the infrastructure node and perform automatic switch over to battery power. Additionally, during periods of normal grid operation, the photovoltaic array provides additional power to run the element of infrastructure, thereby reducing grid power usage, and providing an additional source of revenue for installers of systems according to the invention.

In certain embodiments, battery backup systems are camouflaged as ordinary objects that the public expects to see in proximity to elements of critical infrastructure, for example, as bus shelters. Backup power stations according to such embodiments include illuminated signage that defines an enclosure containing elements of the backup station, for example, batteries, control electronics, and network connection electronics. These enclosures hide sensitive and valuable components from view, provide advertising space for revenue generation, and distract passersby from noticing the presence of the hidden equipment. In some embodiments, the enclosure is provided as an advertising box ("ad box" or "light box"), which is illuminated when grid power is operating normally, but shifts circuits automatically when loss of grid power is sensed. In certain embodiments, the photovoltaic cells provided to charge the backup batteries are provided on conformable, flexible substrates, which are installed to be flush to or integrated with the roof of a bus shelter, thereby hiding them from view.

When an interruption in grid power is detected, stored energy in an oversized battery bank located inside the ad box is directed to maintaining functionality of traffic signals, an associated small cell communications relay station, or some other element of CNIS. Certain embodiments include a power distribution control unit (PDU) that links the battery bank stored energy through a controller or smart power manager of the CNIS platform with the battery UPS unit (if it exists) of a traffic control signal cabinet communicating priority and status. If there is no existing UPS unit, the PDU becomes the Power Distribution Control Unit (PDCU) with the inverter for DC to AC conversion and transformer step up/down.

Additionally, embodiments according the invention use a "smart power manager", to reduce the use of grid power during periods of normal grid functionality. Because CNIS backup units according to embodiments of the invention are continually generating power during the day, which power is not all needed to keep the associated storage batteries charged, this surplus power is used to run infrastructure elements. The smart power manager then switches the infrastructure element back onto grid power when photovoltaic power becomes insufficient to power the infrastructure element, or is needed to charge batteries. In alternative embodiments, surplus photovoltaic power is sold back to the utility to generate revenue.

In one embodiment, the invention includes a system for providing uninterrupted power to elements of infrastructure. The system has a shelter including a wall connected to a roof, and an enclosure defined in part by a portion of the wall. The enclosure defines an interior volume that is not visible to occupants of the shelter. The system also has one or more photovoltaic modules disposed on the roof of the shelter, which generate current when exposed to light. The system has one or more electrical storage batteries disposed in the interior volume of the enclosure, the one or more batteries are electrically connected to the photovoltaic modules such that the photovoltaic modules supply current to the battery when the photovoltaic modules are illuminated.

The system also has an element of infrastructure connected to a power network. The element of infrastructure is selectably electrically connected to said battery via a switch. The system also has a sensor in electrical communication with the element of infrastructure. The sensor is adapted to detect interruption of a flow of power between said element of infrastructure and said power network.

The system also has a CNIS controller in electrical communication with the switch and the sensor. The controller supplies power from the one or more storage batteries to the element of infrastructure when the sensor detects interruption of a flow of power between the element of infrastructure and the power network.

In some cases, the element of infrastructure is a traffic signal. The traffic signal includes a signal controller, and when the sensor detects an interruption of a flow of power between the element of infrastructure and the power network, the CNIS controller sends a signal to the signal controller directing the signal controller to operate the traffic signal with reduced functionality. In these embodiments, the CNIS controller provides a first level of power and a second level of power to the traffic signal, the first level of power being sufficient to operate the traffic signal at a first level of functionality, and the second level of power being sufficient to operate the traffic signal at a second level of functionality, the second level of functionality being less than the first level of functionality. In certain cases, the second level of functionality permits lights of the traffic signal to have only one or more of the following states: blinking red or blinking yellow. In other embodiments, the CNIS controller provides the first level of power during daylight hours, and the second level of power during evening hours. In other cases, the CNIS controller divides power from the photovoltaic modules between the one or more storage batteries and the traffic signal, depending on whether the traffic signal is receiving the first level of power or the second level of power.

In certain embodiments, the element of infrastructure is a cellular communications relay.

In another embodiment, the system includes additional walls defining the enclosure. One or more of the walls comprises a diffuser panel, which interferes with the ability to see inside the enclosure from outside the enclosure. In some embodiments, an illumination source is located within the enclosure. In certain embodiments, textual or graphical information located on the diffuser panel. The illumination source can be connected to the power network, and can be selectably connected to the one or more storage batteries. In certain embodiments, the CNIS controller is adapted to disconnect the illumination source from the one or more storage batteries in the event that the sensor detects an interruption of power from the power network.

In yet another embodiment, the element of infrastructure includes its own backup battery system, and the CNIS controller is adapted to direct current from the photovoltaic modules to the backup battery system. In other embodiments, the system includes a communications module capable of sending data to and receiving data from a central, remotely located control station, and the sent data includes an indication of the status of the power network and an indication of the functionality of the element of infrastructure.

Other embodiments are directed to a method of providing backup power for critical infrastructure nodes. The method involves providing photovoltaic modules on a commonly encountered structure, such that the photovoltaic cells are not visible from street level. The method also includes providing one or more storage batteries connected to said photovoltaic modules, and providing a CNIS controller adapted to selectably electrically connect the one or more storage batteries to an associated infrastructure node in the event of a loss of grid power. The CNIS controller and the one or more storage batteries are arranged in the commonly encountered structure such that they are not visible from street level.

In some embodiments, the commonly encountered structure is a bus shelter. In certain embodiments, the photovoltaic modules are located on the roof of the bus shelter. In other embodiments, the CNIS controller and the one or more storage batteries are located within an ad box, which is part of the bus shelter.

Other embodiments are directed to a system for providing uninterrupted power to grid-connected elements of infrastructure. The system includes a shelter including a wall connected to a roof, and an enclosure defined in part by a portion of the wall, the enclosure defining an interior volume that is not visible to occupants of the shelter. The system also has one or more photovoltaic modules disposed on the roof of the shelter, which generate current when exposed to light, and one or more electrical storage batteries disposed in the interior volume of the enclosure. The system also has a smart power manager including a controller that interrupts a connection between an element of infrastructure and an external power network, and establishes an electrical connection between the photovoltaic modules and an element of infrastructure during periods of high illumination on the photovoltaic modules.

In some embodiments, the smart power manager has a first sensor electrically connected to the external power network, and a second sensor electrically connected to the one or more photovoltaic modules. In other embodiments, the smart power manager includes a first switch between the external power network and an element of infrastructure, a second switch between the one or more photovoltaic modules and the one or more electrical storage batteries, and an inverter electrically connected to an output of the second switch and an input of the first switch. In other embodiments, the smart power manager's controller is adapted to detect an interruption of power in the external power network, and actuate the first switch to supply power to an element of infrastructure, through the inverter, from one of the one or more storage batteries or the one or more photovoltaic modules.

Embodiments of the invention have certain advantages. In contrast to conventional backup systems, embodiments of the invention provide renewable power, i.e. operate without further human intervention for an unlimited time period, within certain parameters, once set up and functioning, and therefore provide true uninterruptible power. The renewable energy feeding UPS systems described herein are unique in that they are unobserved or intentionally hidden from the casual observer, employing the scientific principle of "inattentional blindness" or intentional "cloaking", in that they occupy a space that passersby expect to exist in a conventional system, but which heretofore has not been used in a UPS system. Thus, embodiments of the invention use previously unused space available in a very constrained urban space to provide uninterruptable backup power to critical infrastructure nodes by, for example, employing a bus shelter roof to not only provide light to the shelter, but also uninterrupted power.

Additionally, the embodiments described herein utilize previously unforeseen space in a most utilitarian manner where rights-of-way are limited, and stand-alone or dedicated solar structures have not been or cannot be built because of these space constraints, and stores that power in a manner hidden, disguised or "cloaked", from the casual observer inside the ad box, behind the opaque diffuser sheets, and in a tamper resistant battery enclosure.

Additionally, embodiments of the invention make intelligent decisions regarding power management. For example, when powering a traffic signal, systems according to the invention can, during daylight hours, provide full functionality to the traffic signal, while providing limited functionality to the traffic signal during evening hours, when the system will be relying on battery backup only. Similarly, the system can provide full functionality during high traffic periods, such as week-day, rush-hour periods, while providing limited functionality during off-peak hours, during which time, current will be prioritized for battery charging rather than traffic signal full-functionality. Additionally, the system can provide power to infrastructure elements during normal grid up conditions to lessen the use of grid power.

The idea of the invention is extendible to other types of CNIS nodes, apart from traffic signals and cellular communication infrastructure. Additional critical node applications of the CNIS platform are foreseen at other key locations, such as assisting 911 system backup, providing security lighting for critical areas, and providing power for emergency telephones, signage for emergency exits or evacuation routes, and alarm systems.

These and other features, aspects, and advantages of the present invention will become better understood upon consideration of the following detailed description and drawings.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

The invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
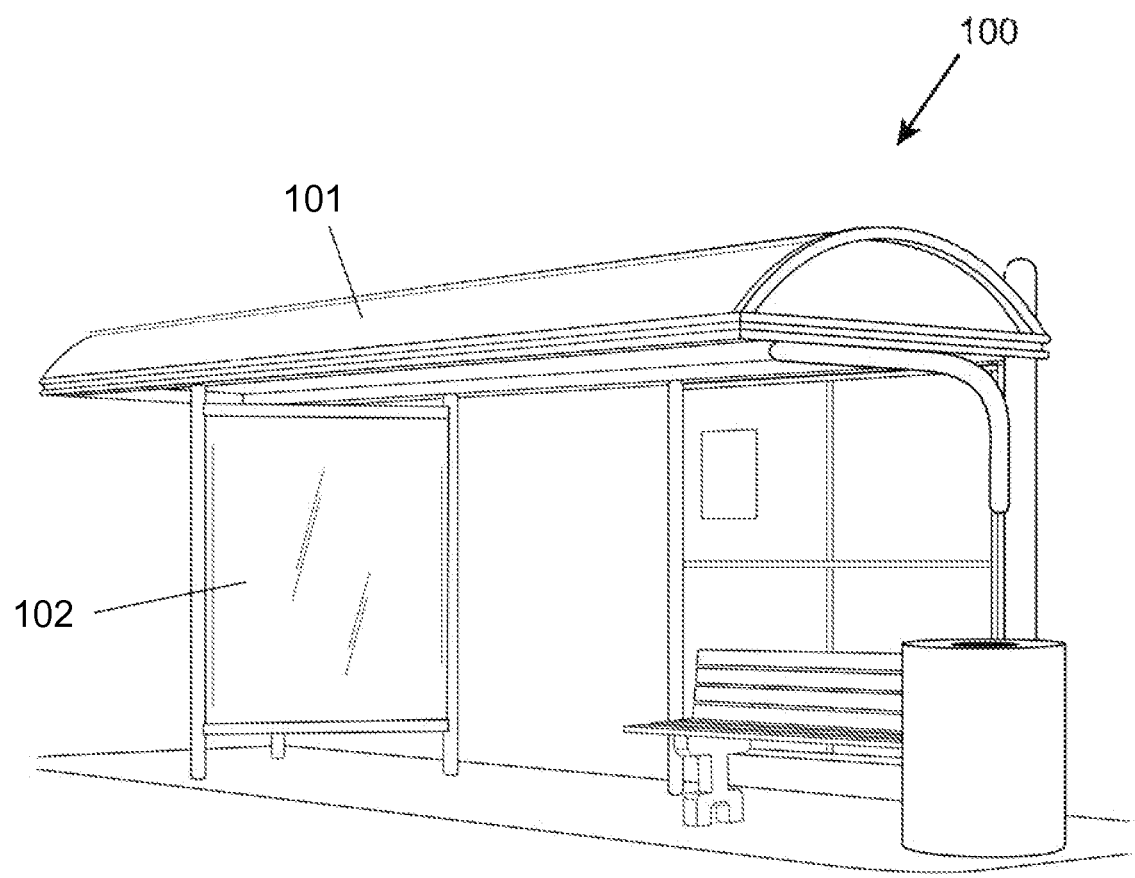
FIG. 1 is a schematic drawing of a conventional bus shelter.

FIG. 1 shows a conventional bus shelter 100. The bus shelter of FIG. 1 includes a roof 101, and ad box 102, which is optionally illuminated to backlight advertisements disposed thereon. Advertisements may be printed on a flexible, semi-transparent substrate that is securely held behind a transparent front cover. The cover is made from some transparent, shock resistant material such as acrylic, polycarbonate or safety glass. Ad box 102 includes a diffuser sheet between a non-illustrated light source, which illuminates the interior of ad box 102, and the advertisement. As used herein "advertisement" refers to any graphical or textual information that may be located on an enclosure capable of concealing the CNIS components discussed below, and is not limited to paid advertisements, but may also include public service announcements, bus schedules, or any other information.

As will become clear through discussion of the inventive embodiments set forth below, critical infrastructure node support is provided by using, common urban furniture, such as the bus shelter of FIG. 1, for a new purpose, namely, for power generation, storage and management. In particular, bus shelters that include boxes or light boxes for supporting advertising of a product or service are employed to camouflage CNIS platform components, the advertisements serving to draw interest away from the interior volume of the ad box in which CNIS platform components are hidden. This arrangement hides or cloaks the CNIS platform components using the principle of inattentional blindness, where valuable items are hidden "in plain site", by providing to the public an object (the ad box), where the public expects to see an object, but where the object conceals valuable CNIS components.

Figure 2:
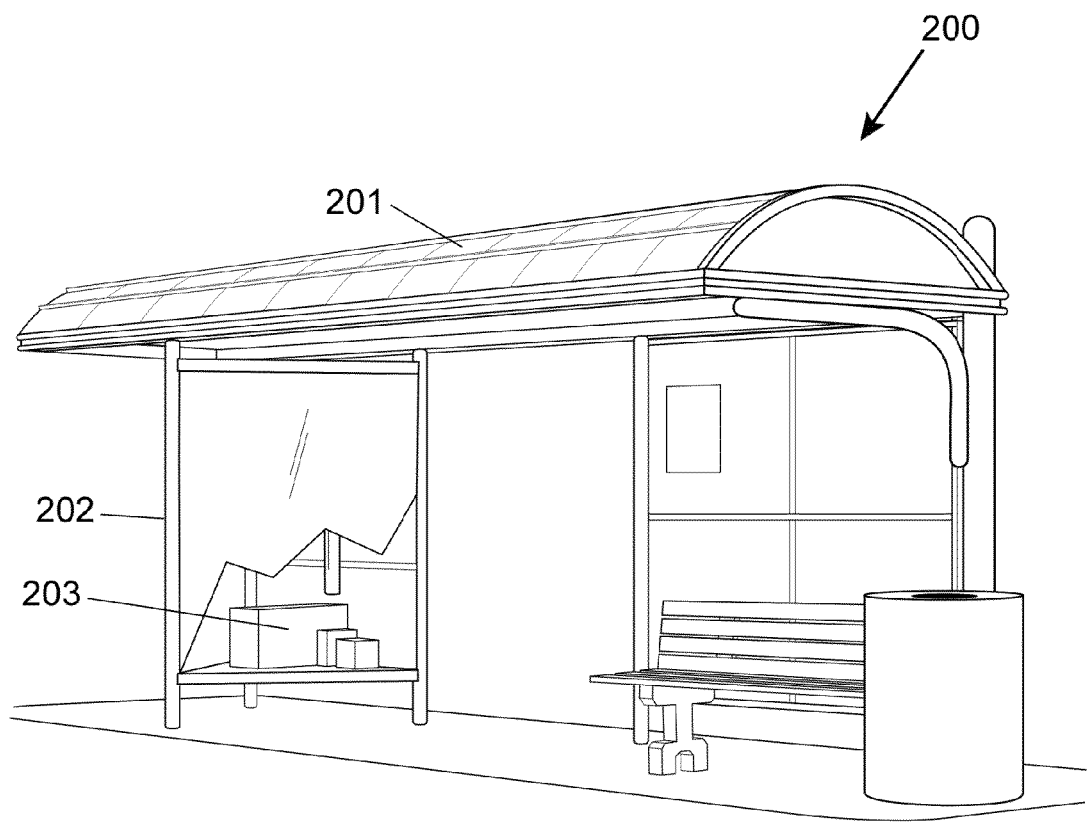
FIG. 2. is a schematic drawing of a bus shelter including a solar collection array, advertising box, and hidden CNIS platform components according to an embodiment of the invention.

FIG. 2. is a schematic drawing of a bus shelter including a solar collection array, advertising box, and hidden CNIS platform components according to an embodiment of the invention. The bus shelter 200 of FIG. 2 includes an ad box 202 having one more walls defining an interior volume. The walls of ad box 202 include one or more diffuser sheets that constitute or are arranged in proximity to walls, which define the ad box 202. In the example of FIG. 2, ad box 202 is triangular in cross section along a vertical line, having two walls that are obliquely transverse to a long dimension of the bus shelter, and a third wall at the back of the bus shelter. This particular form factor is not a requirement. In other embodiments ad box 202 is rectangular in cross section and has sufficient depth and volume for battery storage and accommodation of the other CNIS components. Advertisements are placed onto the diffuser sheets such that they are illuminated from a light source located inside the ad box, through the diffuser sheets, and are therefore visible to passersby, even in low ambient light.

In the arrangement of FIG. 2, the interior volume defined by ad box 202 houses one or more CNIS platform components 203. These components constitute an essentially uninterruptible power supply system, comprising a storage battery bank made up of one or more storage batteries, an electrical inverter, and a CNIS controller, which is set forth in additional detail below. The CNIS components of FIG. 2 provide uninterruptable power because they provide for the storage of energy that may be used on a regular or intermittent basis, which is restored daily by photovoltaic solar modules disposed on roof 201. In the case of FIG. 2, the solar modules are directly adhered to a curved metal roof 201, which, because of its height and curved geometry, does not appear to contain solar generating modules, when in fact it does. In one embodiment, the photovoltaic modules are building integrated flexible photovoltaic (PV) modules that adhere directly to the metal and are not removable but with great difficulty.

While the embodiment of FIG. 2 shows a curved roof segment, which is advantageous for providing a reasonable amount of solar exposure for the photovoltaic modules, this is not a requirement. Other embodiments use building integrated photovoltaics (BIPV) in conjunction with flat roof structures and/or planar sloped roof structures. Still other embodiments use arrays of south facing surfaces arranged at latitude inclination to mount the photovoltaic cells for maximum efficiency. In these cases, the room structure may optionally be surrounded with a parapet to shield the PV arrays from view from street level.

In the arrangement of FIG. 2, electrical current is supplied by the integrated solar modules on roof 201 to charge a battery bank during the day. Additionally, during the day, electrical power is supplied directly to a non-illustrated, electrically connected infrastructure node by the controller manager through an inverter. During evening hours, or other hours of low light, power is supplied to the infrastructure node from the batteries, again by the controller through an inverter.

In certain embodiments, the smart power manager of the system waits to detect the loss of "mains" or "grid" power as normally supplied by the utility company. The loss of grid power can be limited to a single intersection or neighborhood, or can be area or region-wide. The larger the area affected, the greater the utility of the CNIS platform units to allow for continuity of function of either traffic signal or of cellular communications network elements.

Once power loss is detected, the unit either immediately supports continuation of function or, if an existing time-limited back-up system exists, the unit monitors the battery state-of-charge of the existing time-unit to then support continuity with power from the CNIS platform renewable battery bank once the limited back-up draws down its stored energy.

Figure 3:
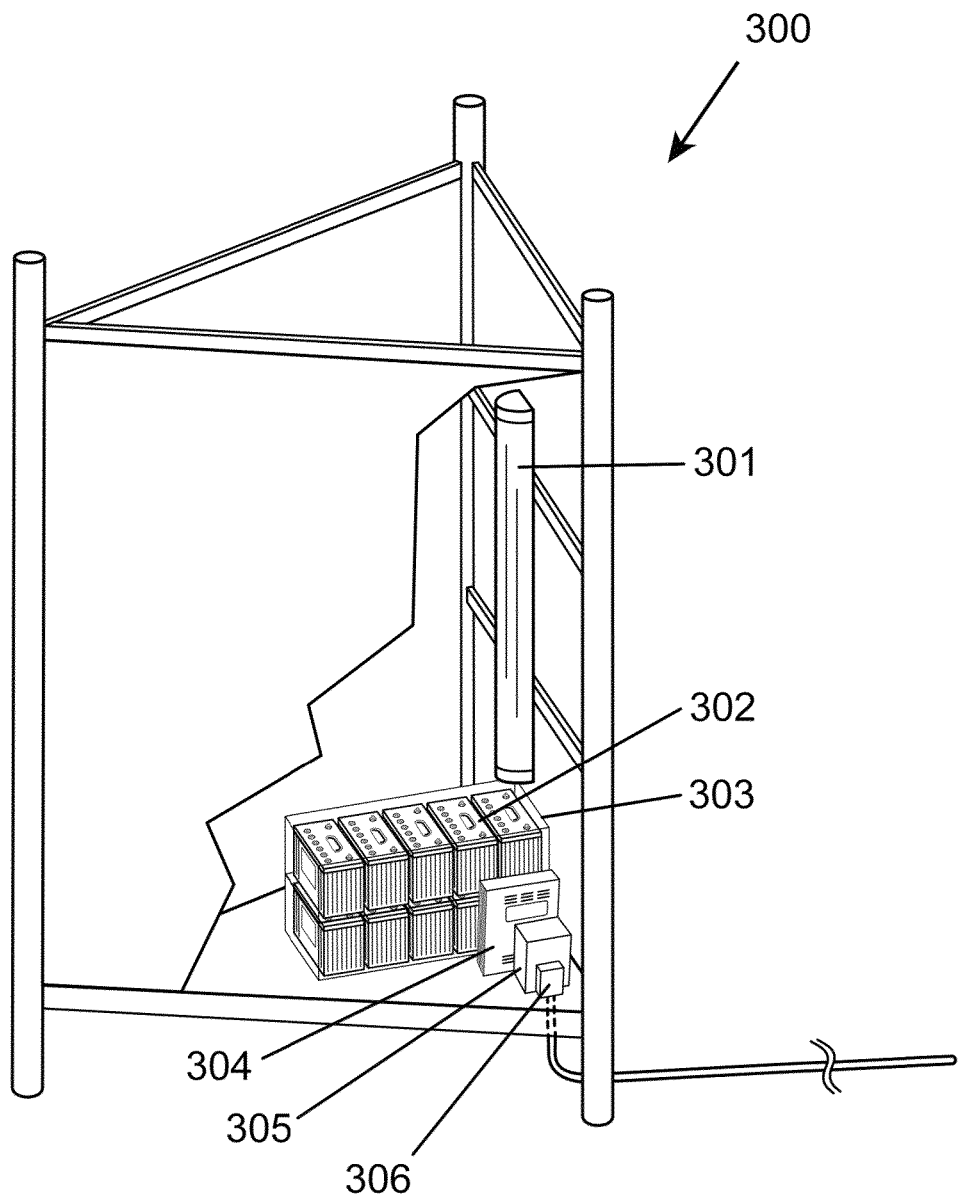
FIG. 3. is a cut-away view of a bus shelter ad box of FIG. 2, including CNIS platform components according to an embodiment of the invention.

FIG. 3, shows the ad box and the CNIS platform components housed therein in additional detail. In the arrangement of FIG. 3, ad box 300 contains a light source 301 to provide lighting for the normal functioning of the ad box. In certain embodiments, light source 301 comprises one or more light emitting diodes housed within a diffusive structure. The CNIS platform of FIG. 3 includes a high capacity battery bank, including one or more batteries 302. In one embodiment, batteries 302 are valve regulated lead acid batteries ("VRLA"), commonly known as sealed lead acid gel batteries or deep cycle absorbed glass mat ("AGM"). Lithium-ion and other advanced chemistry batteries are also acceptable and within the scope of the present invention. Batteries, 302 are housed in a vented enclosure 303, which is manufactured to meet all CALTrans and FTA requirements including being highly tamper resistant. Risk of theft for the CNIS components in the arrangement of FIG. 3 is reduced because the components are intentionally hidden, or cloaked, in the ad box enclosure behind opaque diffuser sheets.

The CNIS components of the arrangement of FIG. 3 include control module 304, which controls lighting of the light source 301, battery charging/discharging of the CNIS platform batteries 302, charging of the batteries of the UPS unit for the infrastructure node (when such unit is present), and monitors grid power. The system also includes data acquisition module 305, which obtains data from instrumentation on system and sub-system performance and status, it then stores the data until uploaded by a communications module 306, to a remote networked database. Operation of the remote networked database is set forth in additional detail below with respect to FIG. 10.

In the embodiment of FIG. 3, the CNIS platform components are located on a lower shelf in ad box 300, however this is not a requirement. In certain embodiments, the CNIS platform components are arranged on an elevated shelf in ad box 300, which is located at a height of approximately 2 m or 6.5' to protect the components from flooding.

Figure 4:
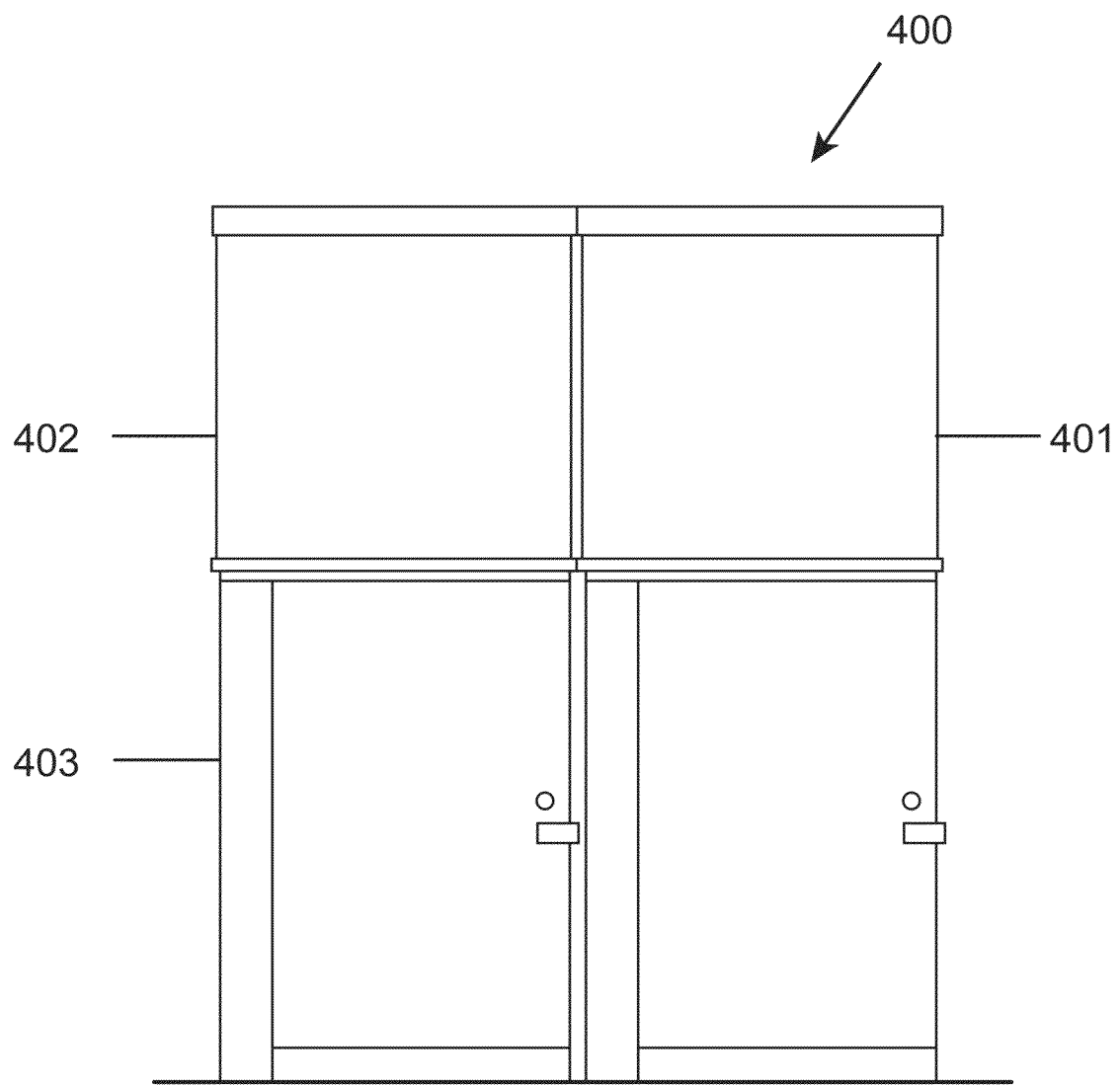
FIG. 4. is a schematic diagram of a traffic signal control cabinet with a power distribution unit usable with an embodiment of the invention.

FIG. 4 is a schematic diagram of an assembly 400 including a pair of traffic signal control cabinets 401, 402. Either or both of traffic signal control cabinets 401, 402 include a power distribution unit ("PDU") 403. Power distribution unit 403 optionally includes a backup battery system ("BBS"), which is also located in a cabinet 401 or 402. Traffic signal cabinet 401 or 402 contains all the necessary elements, including traffic signal controls and communication components, needed to run the traffic signals at the intersection. PDU 403 supplies power to traffic signal controls, by switching between connected grid power and, optionally, a non-illustrated BBS. During the event of a loss of grid power, the BBS is typically sufficient to keep traffic signal lights operational for a limited period of time, usually from ½ hour to 8 hours, depending upon the battery backup system and the electrical demand from the signal lights, communication nodes, or other critical purposes. Conventionally, once this battery backup system has exhausted its stored energy, and if the grid has not returned to supplying electricity to the control cabinet, the signal lights go dark.

In some embodiments, CNIS platform components, such as those set forth above with regard to FIG. 3, interface with existing traffic signal BBS signal to extend the period of operation in a grid-down condition. In these embodiments, backup control module 304 routes power to the traffic signal control cabinet once the cabinet's existing BBS is exhausted. CNIS platform components also intelligently manage the combined capacity of the cabinet BBS and the CNIS platform battery bank to extend the operational life of the signal. For example, prior to exhaustion of either battery bank, the CNIS platform's control module 304 optionally decreases the functionality of the signal in order conserve energy. In one embodiment, when a low charge threshold is crossed by either the BBS batteries or the CNIS platform batteries, control module 304 may direct the traffic controls to go to "red blink" condition. Alternatively, control module 304 manages power from CNIS platform solar cells to provide full functionality to the attached traffic signals during the day, so long as CNIS platform batteries are charged sufficiently to provide at least "red blink" functionality during the night, when the CNIS batteries cannot be recharged. In other words, control module 304, can take stock of the charge stored in the BBS, the CNIS platform batteries, and the amount of recharge current available from CNIS platform solar cells, to supply long a period of full traffic functionality, while still being able to at least provide a "red blink" condition all night. Similarly, the control module 304 can provide a first level of traffic signal functionality during high traffic periods, and a second, lower level of functionality during low traffic periods, when more current will be shunted from the PV modules to charge the batteries. As is set forth above, the CNIS platform components allow the indefinite functioning of the signal, in autonomous mode by supplying power to the BBS from its battery bank located at the bus shelter inside the ad box. The CNIS platform battery bank is replenished on a daily basis by the solar generating power unit located on the roof of the shelter.

Figure 11A:
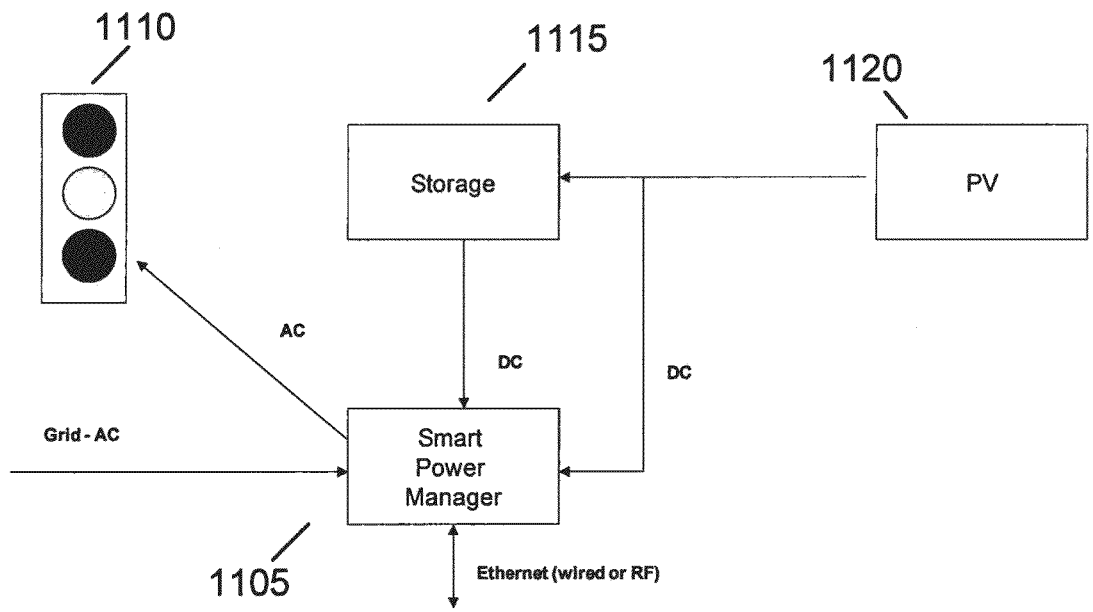
FIG. 11a is a schematic block diagram of an embodiment of invention using a smart power manager.

In addition to providing battery backup in the case of power loss, the CNIS platform according to embodiments of the invention can be used on a day-to-day basis to reduce the consumption of grid power by infrastructure elements. This is accomplished by the use of a smart power manager, which may comprise or take the place of the controller or control module described above. Smart power management of a grid connected traffic signal is illustrated schematically in FIG. 11a. In this embodiment, the CNIS platform includes a smart power manager 1105, which is electrically connected to incoming grid AC power and the traffic signal 1110, which normally receives grid AC. The smart power manager 1105 is also electrically connected to one or more storage batteries, which are charged with DC current from an array of photovoltaic modules. Smart power manager 1105 also receives DC current directly from the PV array 1120.

Figure 11B:
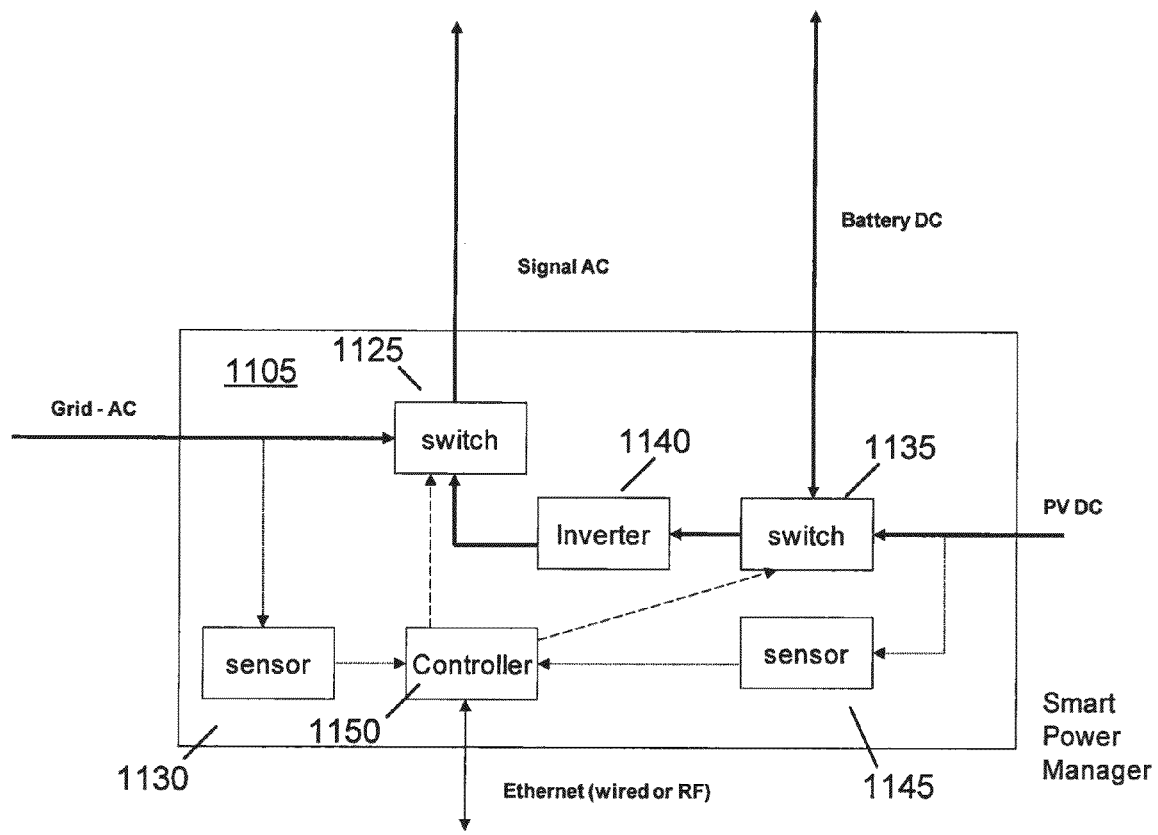
FIG. 11b is a schematic block diagram showing additional detail of the smart power manager.

The internal structures and connections of the smart power manager are set forth in additional detail in FIG. 11b. Smart power manager 1105 includes a first switch 1125, which can selectably connect AC grid power through the smart power manager to power the traffic signal. In electronic communication with the Grid AC connection is a sensor 1130, which detects a grid-down condition, or some other condition suggesting problems with grid power, such as voltage fluctuations. Smart power manager 1105 also includes a second switch, 1135, selectably connected between the PV array 1120, storage batteries 1115, and inverter 1140. Inverter 1140 is also connected to first switch 1125. Smart power manager also includes a second sensor 1145, which monitors voltage on the PV array 1120, i.e., to detect a low-light condition, or some other condition indicating the state of the array. Finally, smart power manager includes controller 1150, which receives data from both sensors, and controls both switches. Controller 1150 is also optionally in networked communication with a remote management site via, for example, a cellular link, radio, or wired communication.

The smart power manager, and in particular, controller 1150, serves to supply power directly from the PV array to illuminate the traffic signal (through inverter 1140), when appropriate. In particular, based on sensor input, when controller 1150 determines that PV power is sufficient to power the traffic signal, controller 1150 switches switch 1125 to supply PV power through inverter 1140 to the traffic signal, while disconnecting grid AC power. This operation would occur, for example, when storage batteries 1115 are "topped off", and do not require further charging from the PV array. When PV power is insufficient to power the traffic signal, e.g., during overcast conditions, early or late daylight hours, or evening hours, controller 1150 disconnects PV power from the traffic signal, reconnects PV power to charge batteries 1115, and reconnects grid AC by actuating switches 1125 and 1135. Alternatively, in a grid down condition, when controller 1150 determines that direct PV power is insufficient for powering the traffic signal, switch 1135 is actuated to supply traffic signal power from batteries 1115 through inverter 1140.

In addition, controller 1150 uses algorithms to control the power consumption of the traffic signal. The algorithm factors in ambient lighting conditions (which are detectable through the PV array and sensor 1145), time of day (which may be kept by an on-board clock, or may be received from an external source over the pictured network condition), the amount PV power, the battery charge level and source of input power. Power consumption is controlled by varying the signal light intensity and its duration of illumination (i.e., by moving from a normal operation state, where the lamps are constantly on, to a "red blink" state). In certain embodiments, some of the traffic signal heads, in the traffic control case, are disabled by the controller when power is insufficient to run all signal heads. The algorithm calculates the necessary signal settings based on available power resources that will enable continuous (24-hour) operation of the traffic signals.

Figure 5:
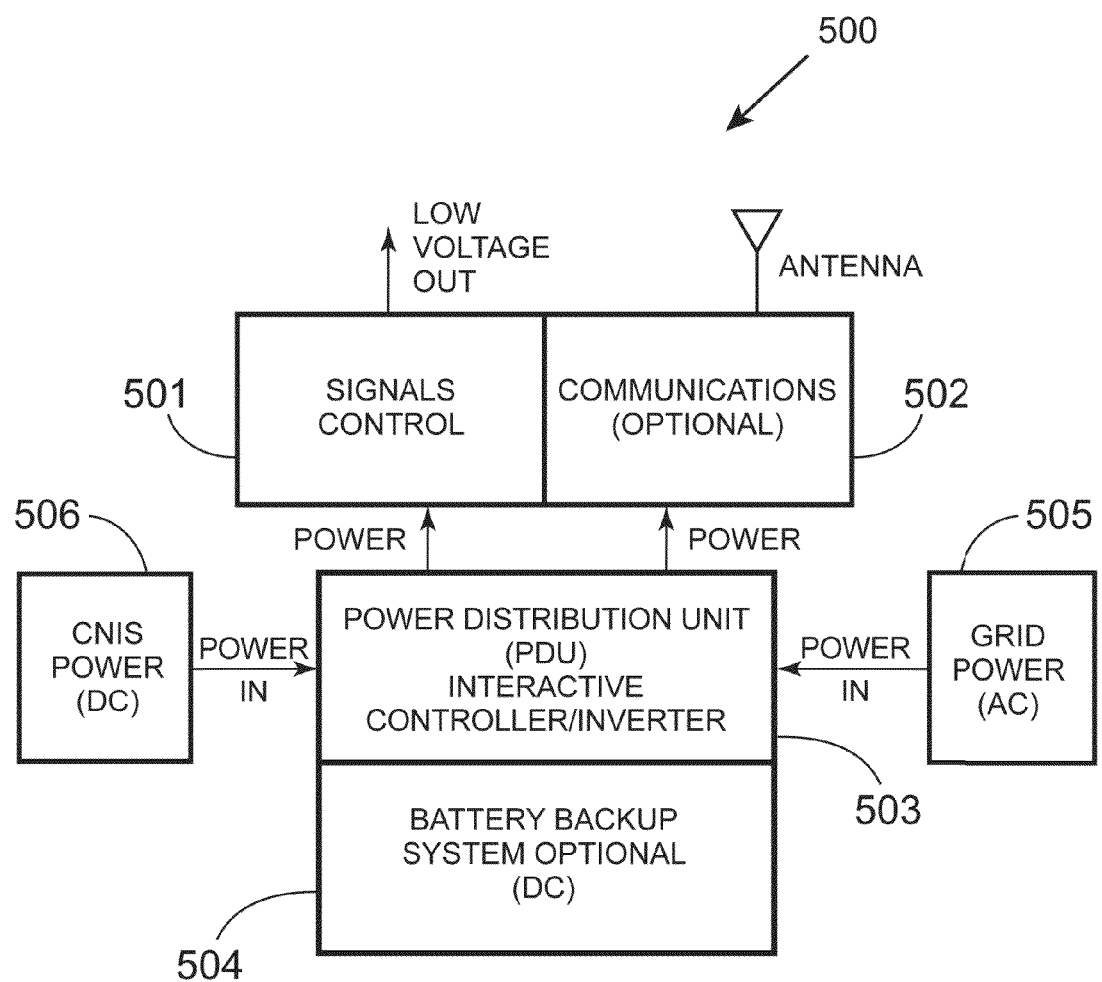
FIG. 5. is a schematic block diagram showing the integration of a CNIS platform according to an embodiment of the invention with a traffic control power distribution unit.

FIG. 5. is a schematic block diagram showing the integration of a CNIS platform according to an embodiment of the invention with a traffic control unit 500, for example a traffic control unit located in cabinets 401, 402 discussed above. Schematically, traffic control unit 500 includes a signal control module 501, which is arranged in electronic communication with non-illustrated traffic signals, to which low voltage signals are supplied. Signal control unit 501 is arranged in electronic communication with communications module 502, which provides external control of signal control unit, for example, by an emergency vehicle equipped with an emergency traffic priority control system. Communications module 502 also allows reports of the status of the signal to be sent wirelessly, or via a wired network, to a remote traffic management system. Communications module 502 also allows for other manual override operations such as timing changes to be provided remotely to signal control unit 501. Communications module 502 communicates externally by cell, radio or landline.

Signal control unit 501 and communications module 502 receive power from PDU 503, which in normal operation, is supplied with AC power from power grid 505. PDU 503 operates in conjunction with a non-illustrated transformer/inverter to convert DC (direct current) to AC (alternating current) when a battery backup system 504 is in place and components require AC output. If no backup system exists and the unit is completely dependent upon power from grid 505, a PDU will be installed either inside or adjacent to the traffic signal control cabinet. In certain embodiments, however, traffic control unit 500 includes a BBS 504, which is kept charged with grid power supplied through PDU 503.

In the embodiment of FIG. 5, CNIS platform unit 506, which includes the components described in reference to FIG. 3, is connect to the PDU 503 to supply true uninterruptible power. As is set forth above, should the stored energy (in both the CNIS platform batteries and BBS 504) prove insufficient to maintain complete functionality (e.g. during extended overcast conditions), the control unit 501 will signal a default condition to change the signals, in the traffic application, to "blinking red" to maintain base functionality.

Figure 6:
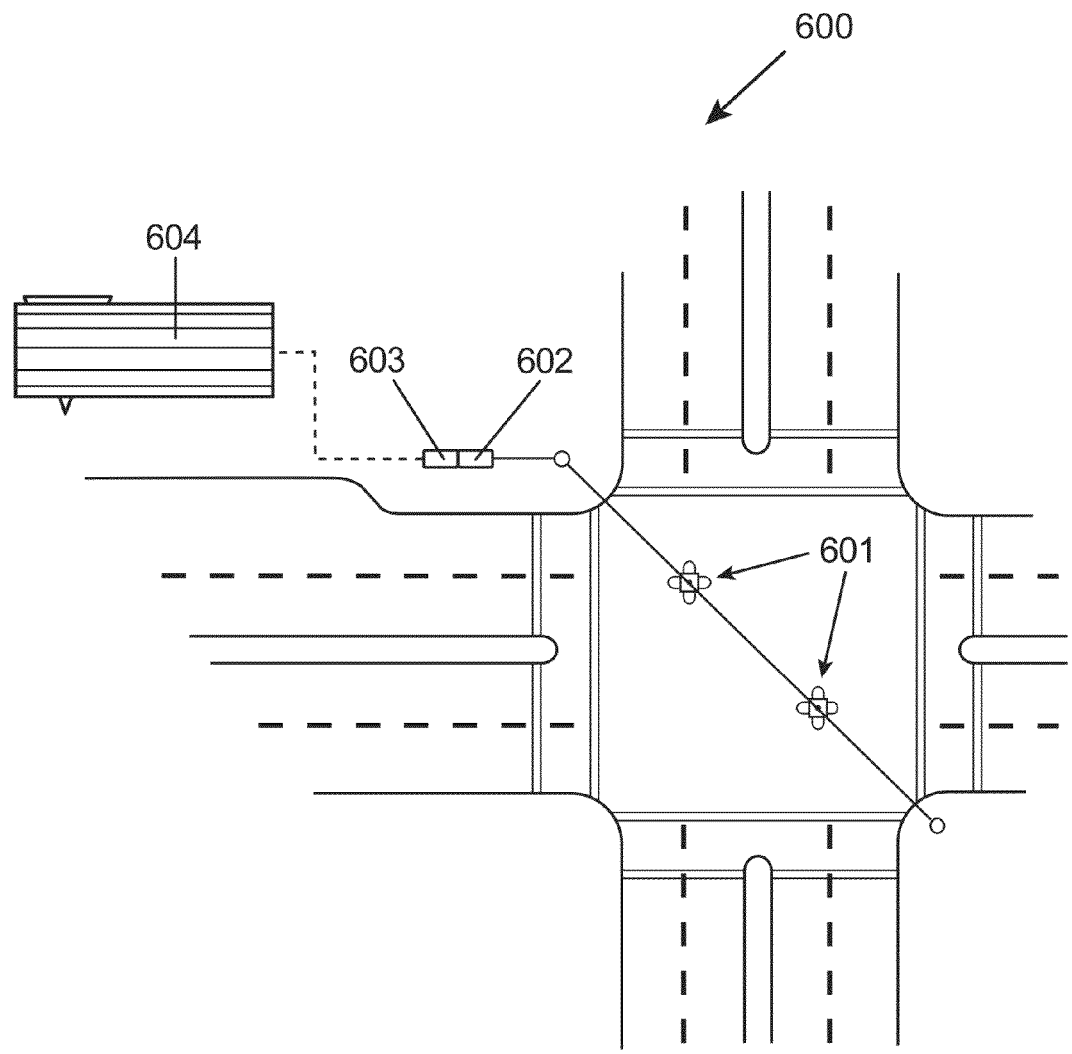
FIG. 6. is a schematic diagram of an intersection including CNIS platform elements according to an embodiment the invention.

FIG. 6. is a schematic diagram of an intersection including CNIS platform elements according to an embodiment the invention. The intersection of FIG. 6 includes one or more signals 601, which are controlled from signal control unit 602 located in a street side control cabinet (i.e., 401, 402). Signal control unit 602 is arranged in electronic communication with PDU 603, which is located in its own enclosure. As is set forth above with respect to FIG. 5, PDU is, in turn, electrically connected to CNIS platform 604, which in the embodiment of FIG. 6, is arranged as a bus shelter as in FIG. 3. Again the right-of-way (i.e., available real estate) is extremely limited in which backup power units can be safely and securely sited. A CNIS platform bus shelter 604 provides renewable power generation and unlimited storage in contrast to a time-limited battery bank, and does so in smaller footprint than a stand-alone generator, which also suffers from limited run-time by requiring access to fuel which may not be available on a timely basis in a large-scale emergency.

Figure 7:
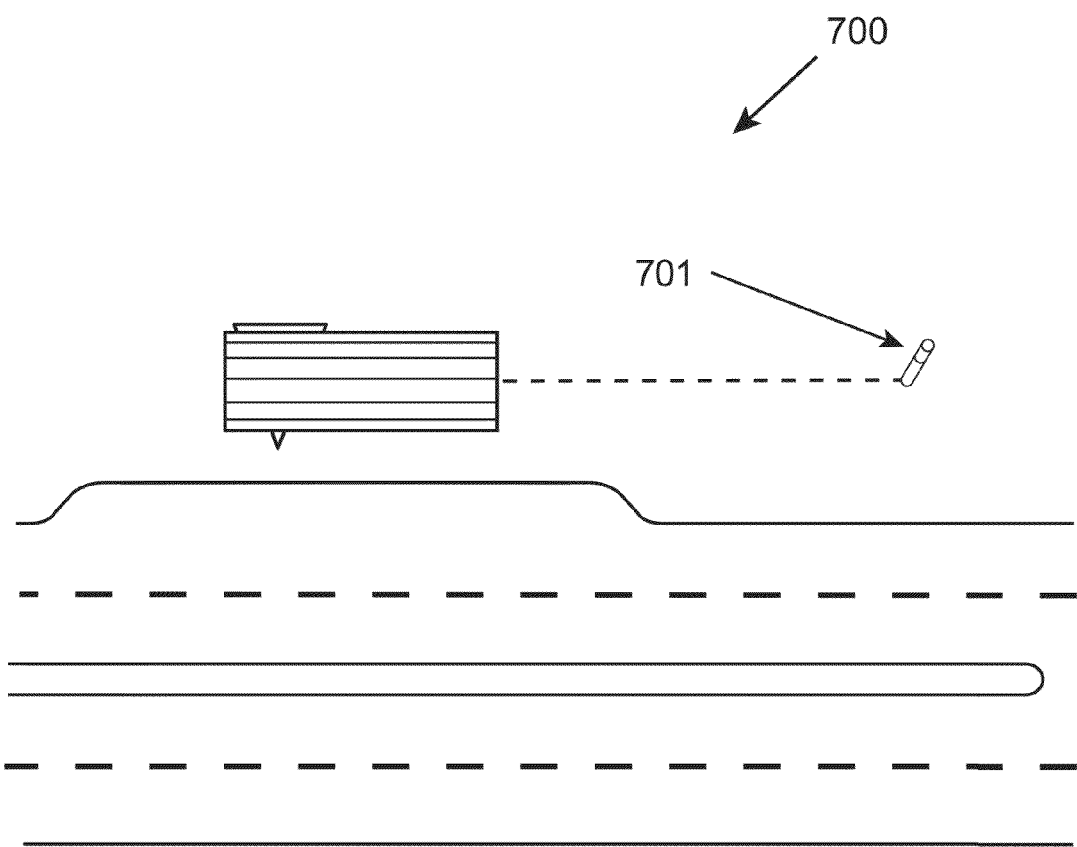
FIG. 7. is a schematic diagram of the CNIS platform according to an embodiment of the invention used in connection with communications infrastructure.

FIG. 7. is a schematic diagram of the CNIS platform according to an embodiment of the invention used in connection with communications infrastructure. In the arrangement 70 of FIG. 7, a CNIS platform bus shelter 702 is provided which, in the embodiments above, includes photovoltaic electrical power generation modules, storage batteries and a control module. The CNIS platform is located on the side of a typical street carrying two way traffic, and supplies electrical power to cellular relay antenna 701, which in some embodiments is located on the upper part of a pole. During normal operation, cellular relay antenna is 701 is powered by grid power, and may optionally include its own limited-time battery backup which, as in the traffic control cases discussed above, is kept "topped off" with grid power. In the event of a loss of grid power, and/or an exhaustion of battery backup power, power is supplied from the CNIS platform 702 to the cellular relay antenna 701.

Figure 8:
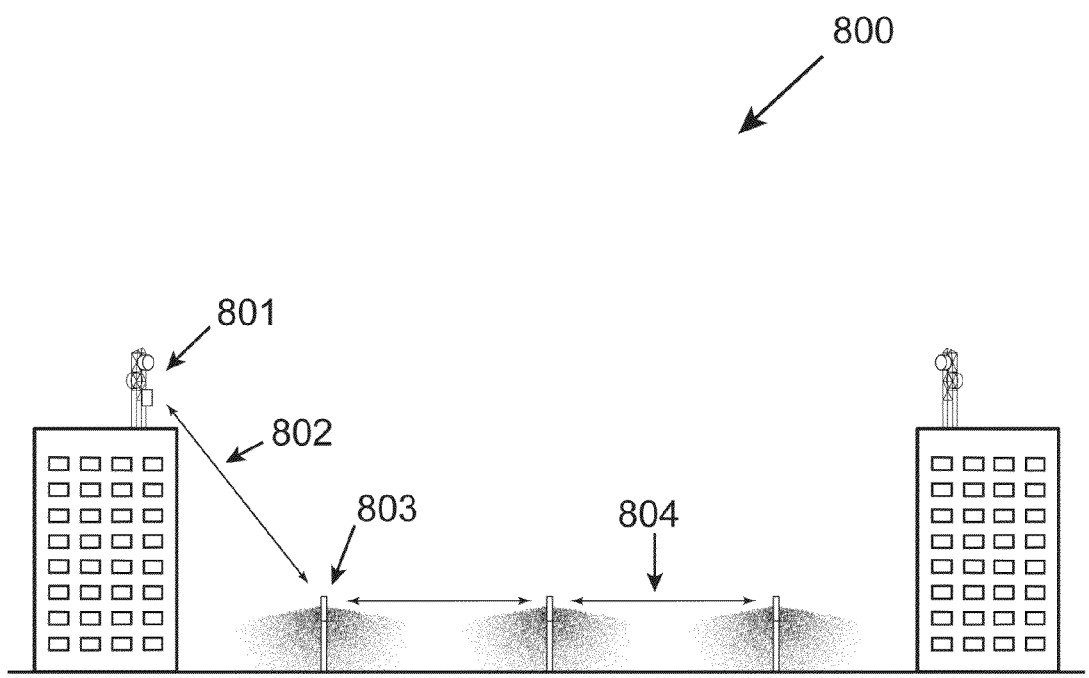
FIG. 8. is a schematic diagram of a telecommunications network using the CNIS platform according to an embodiment of the invention.

FIG. 8 shows a typical but simplified cell tower back-haul network 800, with cell relay with a base tower 801 mounted on the top of a structure for further transmission by either fiber optic cable or micro-wave transmission. Base tower 801 maintains a wireless communications link 802 with one or more cellular relay antennas 803. Relay antennas 803 maintain a wireless communication link 804 with additional relay antennas. As can be seen in FIG. 8, the network of relay antennas 803 provide back-haul line-of-sight transmission (LoS) between lower power relay antennas 803 to the base station (801). Relay antennas 803, which are smaller than the traditional cell "towers" are distributed in urban areas to provide extended coverage for towers 801, and to act as peer-to-peer relays for local cellular communications. Because these small cell relay points are very vulnerable to power loss during times of emergency or disaster, they are electrically connected to one or more CNIS power backup units according to the embodiments described above, to allow for uninterruptible operation and greater resiliency.

Figure 9:
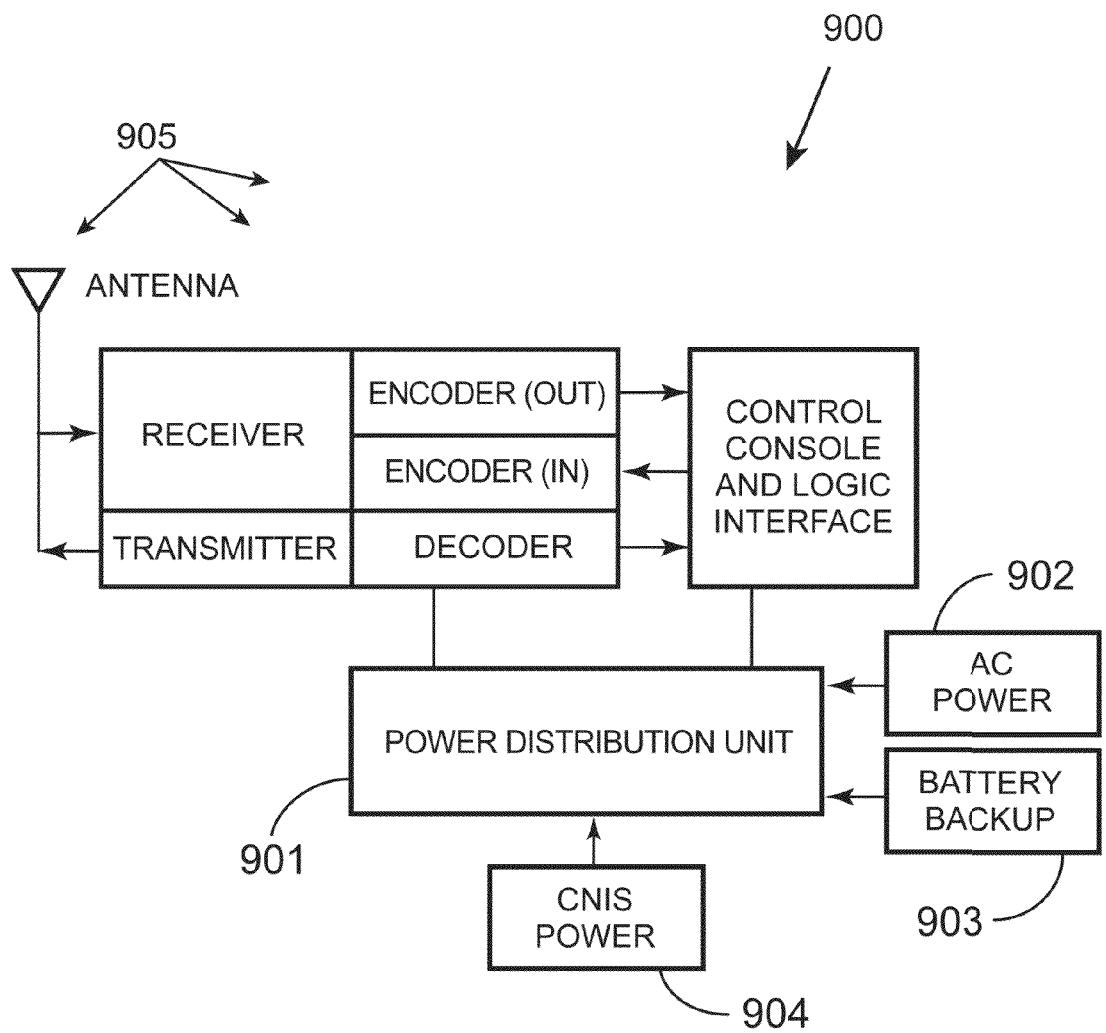
FIG. 9. is a schematic block diagram showing the integration of a CNIS platform according to an embodiment of the invention with a cellular relay.

FIG. 9, is a schematic block diagram showing the integration of a CNIS platform according to an embodiment of the invention with a cellular relay. In the arrangement of FIG. 3, a cellular relay 900 is provided having a variety of cellular communications components 905, which are supplied with power from a power distribution unit 901. As in the traffic signal case, PDU 901 in a default condition is supplied with AC power from a grid source 902. PDU may also optionally be equipped with its own battery backup system 903. In the embodiment of FIG. 9, PDU is electrically connected to CNIS unit 904, which supplies backup power in the case of a grid-down condition and/or when BBS 903 is exhausted.

It will be appreciated that providing a network of solar-refreshed power supplies for critical infrastructure, particularly in an urban setting, supplies many opportunities for data collection and analysis. For example, because CNIS units according to the invention can be networked (e.g., over cellular networks, radio networks, or wired networks) to traffic or communications management locations, CNIS units can pass a variety of useful data to central operators in the event of an emergency serving as an element of a smart grid or smart city. Chief among these data is an indication of grid status in the vicinity of the CNIS unit, which the CNIS unit necessarily monitors to detect a grid down condition. Additionally, the CNIS unit is capable of tracking and reporting the status of infrastructure equipment being powered, e.g., whether a cell relay is on or off, how much power it is drawing, and the state of a traffic signal. These data collection and reporting features provide managers with a parallel and alternative means of tracking grid status, and locating potential problem areas, thereby enhancing the developing smart grid.

"Smart grid" technology generally refers to random access power switching as an alternative to conventional power systems which power large grids or circuits, from which a variety of users draw power as needed. A "smart grid" allows for transmission to be randomly configured between power generation and demand points to meet time varying local demand, while minimizing losses. As the "smart grid" comes online, CNIS units according to embodiments of the invention will be available as decentralized, distributed power sources, the power from which may be routed through the smart grid to remote elements of infrastructure. For example, in the event of a persistent, widespread outage, power from a plurality of CNIS energy generating bus shelters according to the invention could be selectively routed to power certain super-critical users, such as hospitals, FEMA aid stations, or the like.

Figure 10:
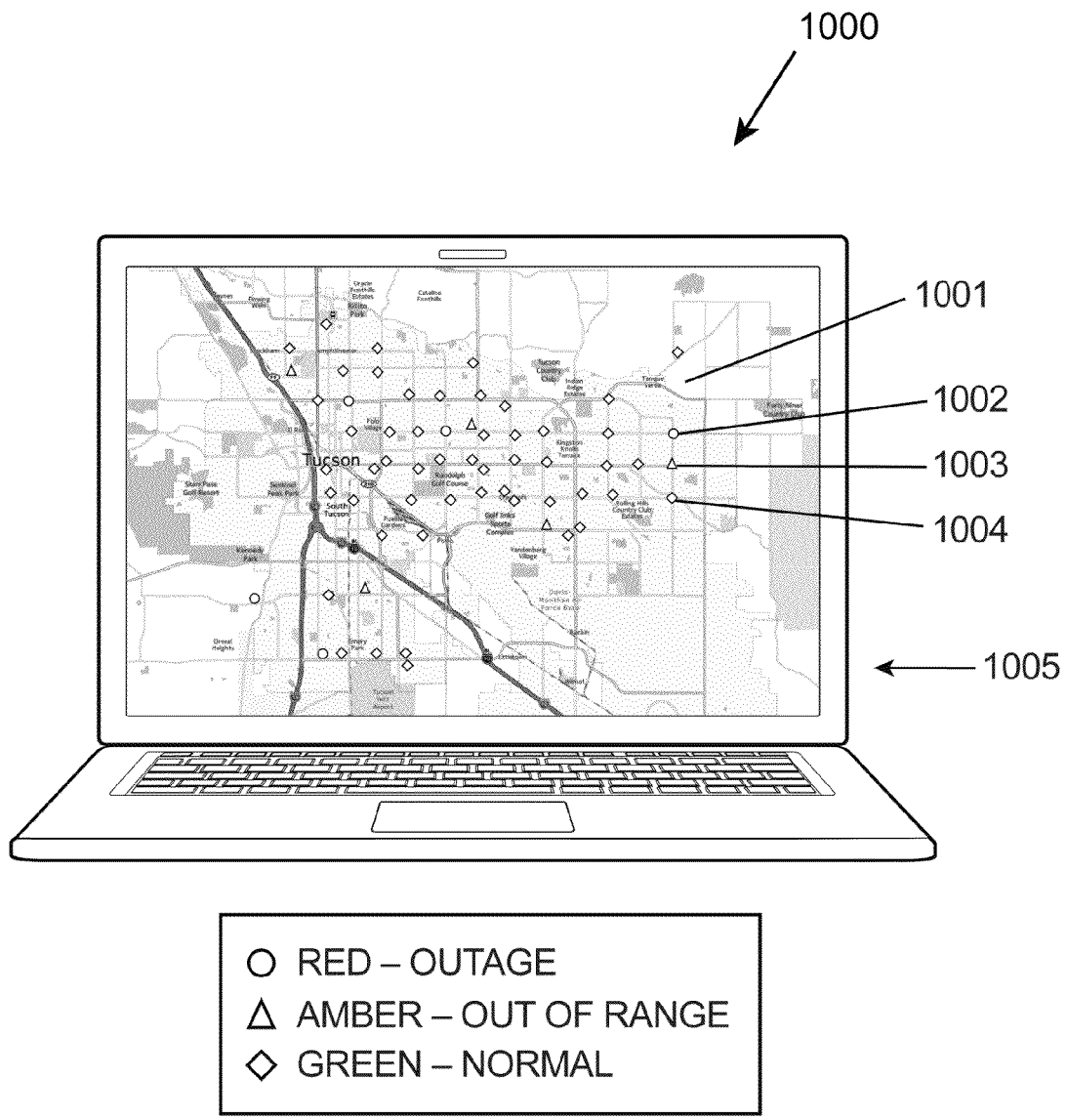
FIG. 10. is a sample screen shot generated by a computer program product in accordance with an embodiment of the invention.

Accordingly, certain embodiments of the invention include a computer program product having computer readable program code executable by a programmable computer processor in communication with both one or more CNIS units and non-volatile computer storage (e.g., a hard drive). The computer readable program code is sufficient to cause a programmable processor to cause a display to display the status of CNIS units and their associated powered elements of infrastructure. FIG. 10 is a sample screen shot generated by a computer program product in accordance with an embodiment of the invention. A computer program product in accordance with the invention provides a system operator or manager visibility into the functioning of the CNIS platform system, as well as the nodes themselves. This is represented as a map of a metro region 1001 with alert icons representing "outage" 1002 as a circle indicating requiring immediate attention, "out of normal range" 1003 as a triangle indicating fluctuating system parameters with a possible failure of a component in the near future as likely, and "working normally" 1004 as a diamond.

In certain embodiments, these symbols are color coded so that the operator can make rapid diagnoses, as red, amber and green, respectively. The operator is able to access the system information via password protected portals either from the office or the field.

Based on the foregoing, a method of providing stored energy by equipping certain structures that provide other functions, such as bus shelters, with renewable energy generating and storing means, such as photovoltaic modules and batteries, and that are disguised such that, preferably, the so-equipped structures are indistinguishable from non-equipped structures, is disclosed.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A system for providing uninterrupted power to elements of infrastructure, comprising:
   a shelter including a wall connected to a roof, and an enclosure defined in part by a portion of the wall, the enclosure defining an interior volume that is not visible to occupants of the shelter;
   one or more photovoltaic modules disposed on the roof of the shelter, which generate current when exposed to light;
   one or more electrical storage batteries disposed in the interior volume of the enclosure, the one or more batteries being electrically connected to the photovoltaic modules such that the photovoltaic modules supply current to the battery when the photovoltaic modules are illuminated;
   an element of infrastructure connected to a power network, the element of infrastructure also being selectably electrically connected to said battery via a switch;
   a sensor in electrical communication with said element of infrastructure and adapted to detect interruption of a flow of power between said element of infrastructure and said power network;
   a Critical Node Infrastructure Support (CNIS) controller in electrical communication with said switch and said sensor, the controller adapted to supply power from said one or more storage batteries to said element of infrastructure when the sensor detects interruption of a flow of power between said element of infrastructure and said power network,
   wherein the element of infrastructure comprises a traffic signal, and
   wherein the traffic signal comprises a signal controller, and wherein, when the sensor detects an interruption of a flow of power between said element of infrastructure and said power network, the CNIS controller sends a signal to the signal controller directing the signal controller to operate the traffic signal with reduced functionality.

2. The system of claim 1, further comprising additional walls defining the enclosure, wherein one or more of the walls comprises a diffuser panel, which interferes with the ability to see inside the enclosure from outside the enclosure.

3. The system of claim 2, further including an illumination source located within said enclosure.

4. The system of claim 3, further including textual or graphical information located on said diffuser panel.

5. The system of claim 3, wherein the illumination source is connected to the power network.

6. The system of claim 3, wherein the illumination source is selectably connected to the one or more storage batteries.

7. The system of claim 3, wherein the CNIS controller is adapted to disconnect the illumination source from the one or more storage batteries in the event that the sensor detects an interruption of power from the power network.

8. The system of claim 1, wherein element of infrastructure includes its own backup battery system, and wherein the CNIS controller is adapted to direct power from the photovoltaic modules to the backup battery system.

9. The system of claim 1, further including a communications module capable of sending data to and receiving data from a central, remotely located control station, wherein the sent data includes an indication of the status of the power network and an indication of the functionality of the element of infrastructure.

10. A system for providing uninterrupted power to elements of infrastructure, comprising:
   a shelter including a wall connected to a roof, and an enclosure defined in part by a portion of the wall, the enclosure defining an interior volume that is not visible to occupants of the shelter;
   one or more photovoltaic modules disposed on the roof of the shelter, which generate current when exposed to light;
   one or more electrical storage batteries disposed in the interior volume of the enclosure, the one or more batteries being electrically connected to the photovoltaic modules such that the photovoltaic modules supply current to the battery when the photovoltaic modules are illuminated;
   an element of infrastructure connected to a power network, the element of infrastructure also being selectable electrically connected to said battery via a switch;

a sensor in electrical communication with said element of infrastructure and adapted to detect interruption of a flow of power between said element of infrastructure and said power network;

a Critical Node Infrastructure Support (CNIS) controller in electrical communication with said switch and said sensor, the controller adapted to supply power from said one or more storage batteries to said element of infrastructure when the sensor detects interruption of a flow of power between said element of infrastructure and said power network, wherein the element of infrastructure comprises a traffic signal, and wherein the CNIS controller is adapted to provide a first level of power and a second level of power to the traffic signal, the first level of power being sufficient to operate the traffic signal at a first level of functionality, and the second level of power being sufficient to operate the traffic signal at a second level of functionality, the second level of functionality being less than the first level of functionality.

11. The system of claim 10, wherein the second level of functionality permits lights of the traffic signal to have only one or more of the following states blinking red or blinking yellow.

12. The system of claim 10, wherein the CNIS controller is adapted to provide the first level of power during daylight hours, and the second level of power during evening hours.

13. The system of claim 10, wherein the CNIS controller is further adapted to divide power from the photovoltaic modules between the one or more storage batteries and the traffic signal, depending on whether the traffic signal is receiving the first level of power or the second level of power.

\* \* \* \* \*